United States Patent [19]

Ajtai

[11] Patent Number: 5,737,425
[45] Date of Patent: Apr. 7, 1998

[54] CRYPTOSYSTEM EMPLOYING WORST-CASE DIFFICULT-TO SOLVE LATTICE PROBLEM

[75] Inventor: Miklos Ajtai, Los Gatos, Calif.

[73] Assignee: International Business Machines Corporation, Armonk, N.Y.

[21] Appl. No.: 646,806

[22] Filed: May 21, 1996

[51] Int. Cl.$^6$ .................................................. H04K 1/00
[52] U.S. Cl. .................................................. 380/30; 380/2
[58] Field of Search .................................................. 380/30

[56] References Cited

U.S. PATENT DOCUMENTS

| | | | |
|---|---|---|---|
| 4,200,770 | 4/1980 | Hellman et al. | 178/22 |
| 4,218,582 | 8/1980 | Hellman et al. | 178/22 |
| 4,405,829 | 9/1983 | Rivest et al. | 178/22.1 |
| 4,424,414 | 1/1984 | Hellman et al. | 178/22.11 |
| 4,932,056 | 6/1990 | Shamir | 380/30 |
| 4,995,082 | 2/1991 | Schnorr | 380/23 |
| 5,231,668 | 7/1993 | Kravitz | 380/28 |
| 5,297,206 | 3/1994 | Orton | 380/30 |

OTHER PUBLICATIONS

A. V. Aho et al., "The Design and Analysis of Computer Algorithms", Addison–Wesley publishing Co., Chapter 10, pp. 364–365.

M. R. Garey et al., "Computers and Intractability: A Guide to the Theory of NP–Completeness", W. H. Freeman and Co., Chapter 1, pp. 1–14.

D. S. Johnson, "Algorithms and Complexity", Handbook of Theoretical Computer Science, Vol. A, Chapter 2, The MIT Press, 1990, pp. 69–77.

R. L. Rivest, "Algorithms and Compexity", Handbook of Theoretical Computer Science, vol. A, Chapter 13, The MIT Press, 1990, pp. 99.719–729.

M. Grotschel, L. Lovasz, A. Schrijver, Geometric Alogrithms and Combinatorial Optimization, 2nd Corrected Edition–Book; QAA167, G761, 1993 Math; Chapter 5, Diophantine Approximation and Basis Reduction, pp. 133–156.

Ajtai, "Generating Hard Instances of Lattice Problems", Electronic Colloquium on Computational Complexity, Report TR96–007, posted on the World Wide Web at ftp:// ftp.eccc.uni–trier.de/pub/eccc/reports/1996/TR96–007/index.html Jan. 30, 1996.

*Primary Examiner*—David C. Cain
*Attorney, Agent, or Firm*—James C. Pintner

[57] ABSTRACT

A cryptosystem and cryptographic method are provided for performing tasks such as encoding/decoding, signing messages, and verifying identity. The system and method employ a problem which is difficult to solve in the worst case. Because of the worst-case nature of the problem employed, a system and method according to the invention has advantageous level of security, In a class of preferred embodiments, the difficult problem is one of the recognized difficult problems associated with the mathematical theory of lattices. These problems include finding short vectors and sets of basis vectors from a lattice. Cryptographic protocols are performed, using these problems.

45 Claims, 7 Drawing Sheets

CRYPTOSYSTEM EMPLOYING WORST-CASE DIFFICULT-TO SOLVE LATTICE PROBLEM

NOTES ON MATERIALS CITED AS AN APPENDIX

The present patent application has been prepared based on two papers authored by the inventor, titled "Generating Hard Instances of Lattice Problems" and "Cryptographic Protocols Based on Lattice Problems." These papers include additional subject matter, such as proofs of the theorems and/or lemmas stated herein without proof, as well as restatements of much of the same subject matter as given in the specification which follows. These papers are incorporated herein by reference, and are designated as an Appendix to this patent application.

Note, additionally, that a preliminary version of "Generating Hard Instances of Lattice Problems" has been posted on the World Wide Web, and is cited in the accompanying Information Disclosure Statement.

FIELD OF THE INVENTION

This invention generally relates to the field of cryptography and cryptosystems. More particularly, the invention relates to a system and method for providing enhanced cryptographic security by basing a public/private key cryptosystem on a class of problems whose instances are provably as difficult to solve as a worst-case problem.

BACKGROUND OF THE INVENTION
THE SECURITY OF CRYPTOSYSTEMS

A cryptosystem is usable, for secure communication between users, only if the users may expect that a third party, called a "cryptanalyst," will not be able to break the cryptosystem. The definition of the term, "to break" the system, includes several different activities which the users seek to prevent the cryptanalyst from doing. Breaking a cryptographic system includes any of the following activities: reading messages sent between the users, producing a fake identification of one user, which appears authentic to the other user, by conforming with certain authenticity criteria which should be inaccessible to anyone other than the users, forging a digital signature for a message to falsely indicate that the message was sent by the apparent signer, etc.

If a cryptosystem cannot be broken, then the cryptosystem is said to be "secure." However, making a secure cryptosystem is easier said than done: at the present time, there is no mathematical proof of the safety of any of the known and used cryptosystems, if the key is significantly shorter than the message. (There is a well-known one-time pad system which is provably secure. However, because it uses a key which is as long as the message, it is frequently impracticable to use.)

There are, however, relative mathematical proofs of the security of certain cryptosystems, in the sense that the security of the cryptosystem follows from an unproven but simple assumption, the assumption being widely believed to be true.

One cryptosystem is considered to be "more secure" than another, if, in the scientific community, there is a stronger belief that the first cryptosystem's underlying assumption is true. The belief that one cryptosystem is more secure than another is usually based on an extensive body of related research. Some such bodies of research have originated with work done hundreds of years ago. As a consequence, the long period of time during which the underlying assumption has been studied lends credence to the belief that the cryptosystem based on the underlying assumption is in fact secure.

AVERAGE-CASE VERSUS WORST-CASE PROBLEMS

Most of the cryptosystems used today employ a certain class of problems. That is, use of a conventional cryptosystem is based on knowledge of the solution to a problem. As a corollary, finding the (unknown) solution to the problem is a prerequisite for a cryptanalyst breaking the encryption.

A particular cryptosystem, or a message encrypted using a particular cryptosystem, will be based on an individual case of the underlying problem. The general form of the cryptosystem will be the same, regardless of the particular case pf the problem used. However, the security of the encrypted message will be determined, not only on the problem in general, but also on the particular case of the problem which was used in this instance to encrypt this message. It will be understood that, if a cryptosystem based on a particular problem is used repeatedly, different cases of the problem will be used for different messages.

The security of these cryptosystems is based on an assumption (not necessarily proven) that the problem upon which the encryption algorithm is based is difficult to solve in the average case. That is, while some cases are easier than others, and while there is not necessarily a finite, or ascertainable, total number of possible cases, it is at least empirically evident that, to a high probability, a randomly chosen case will be sufficiently difficult to be useful for purposes, such as cryptography, that require that the case be difficult.

For instance, the commonly-used RSA cryptosystem given in Rivest et al., U.S. Pat. No, 4,405,829, "Cryptographic Communications System and Method," employs a number which is a product of two large prime numbers. This cryptosystem is considered to be secure to the degree that it is difficult to factor a large, randomly chosen number, particularly a product of two large prime numbers.

The RSA cryptosystem encrypts a plaintext message M into a cryptogram C. The plaintext message M initially is given in terms of a number having a value between 1 and a large number n, n being the product of two large prime numbers p and q. Encrypting M to produce C is done as follows:

First, M is divided into blocks, as appropriate. M, or each block thereof, is transformed, i.e., encrypted, to the ciphertext C as per the expression $$C = M^e \pmod{n}$$

where e is a number relatively prime to the product $(p-1)(q-1)$. The encrypting key (public key) consists of the two numbers e and n.

To decrypt the ciphertext C, a decrypted message M' (which should be identical to M)

$$M' = C^d \pmod{n}$$

is obtained from the decryptor. The decrypting key consists of the two numbers d and n. The number d, known only to the holder of the decrypting key, is a multiplicative inverse of $$e \pmod{\mathrm{lcm}((p-1)(q-1))}$$

Thus, $$ed = 1 \pmod{\mathrm{lcm}((p-1)(q-1))}$$

A cryptanalyst would have to factor n, in order to obtain d. Thus, it will be seen that the processes of encryption and decryption, as practiced in the RSA cryptosystem, make direct use of the factoring problem.

The security of the RSA cryptosystem, and that of other conventional cryptosystems, are based on the average-case difficulty of their underlying classes of problems. The difficulty of the RSA cryptosystem is limited by the fact that the ease of factoring numbers varies drastically. There are certain large numbers which, despite their size, are very easy to factor. For example, any power of 10, however great, is easy to factor. On the other hand, the product of two large prime numbers is more difficult to factor.

Therefore, the factoring problem used in the RSA cryptosystem is an example of a problem which is difficult in the worst case, but not difficult, or much less difficult, in the average case.

Apart from the practical applications to cryptosystems, mathematicians traditionally have been more interested in worst-case problems. The mathematical study of average case problems, such as the above-mentioned problem about factoring, started relatively recently, only a few decades ago.

A worst case problem is considered difficult if there is a single instance of the problem that is difficult to solve. Unlike that of an average-case problem, the difficulty of a worst-case problem is not reduced if most of the instances of the problem must be difficult. It has been suggested that the difference between worst-case and average-case problems may be grasped intuitively in terms of two variations on an old aphorism. For a worst-case problem, "a chain is as strong as its strongest link." For an average-case problem, "a chain is as strong as most of its links."

Based on these considerations, it has been a generally accepted principle in the computer science community that a cryptosystem based on a famous worst-case problem would be superior, from the point of view of security, to the conventional average-case based systems. However, to date, no known cryptosystem has based its security on any worst-case problem.

SUMMARY OF THE INVENTION

It is therefore an object of the invention to provide a cryptosystem whose security is based on the hardness of a worst-case problem.

To achieve these and other objects, there is provided, in accordance with the invention a cryptographic system and method, based, in theory, on the premise that breaking the encryption is commensurate in difficulty with solving a problem which is difficult to solve in the worst case. The cryptosystem is presented in terms of a set of protocols, which perform various encryption-related tasks. Certain key steps of the protocols employ problems as difficult as the worst-case problems.

A noteworthy aspect of the invention arises out of theoretical work. It has been proven, by the inventor, that, for certain types of problems to be used in accordance with the invention, one can generate an instance of the problem at random. If the randomly selected instance of the problem is easy to solve, then another, worst-case instance also is easy. The contrapositive of this statement is that, if the worst-case instance is difficult, then a randomly selected instance also is difficult.

A preferred embodiment of the invention utilizes a known problem for which the above statement holds. This is the problem, generally stated, of finding short vectors in lattices. In the discussion that follows, it will be seen that there are actually several different problems relating to vectors in lattices. Initially, there will be presented a discussion of lattice theory and the background for the lattice problems used in the key steps of the protocols. Afterward, this will be applied to several cryptographic protocols.

While aspects of the invention are disclosed as method steps, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

DESCRIPTION OF A PREFERRED EMBODIMENT OF THE INVENTION

Figure 1:
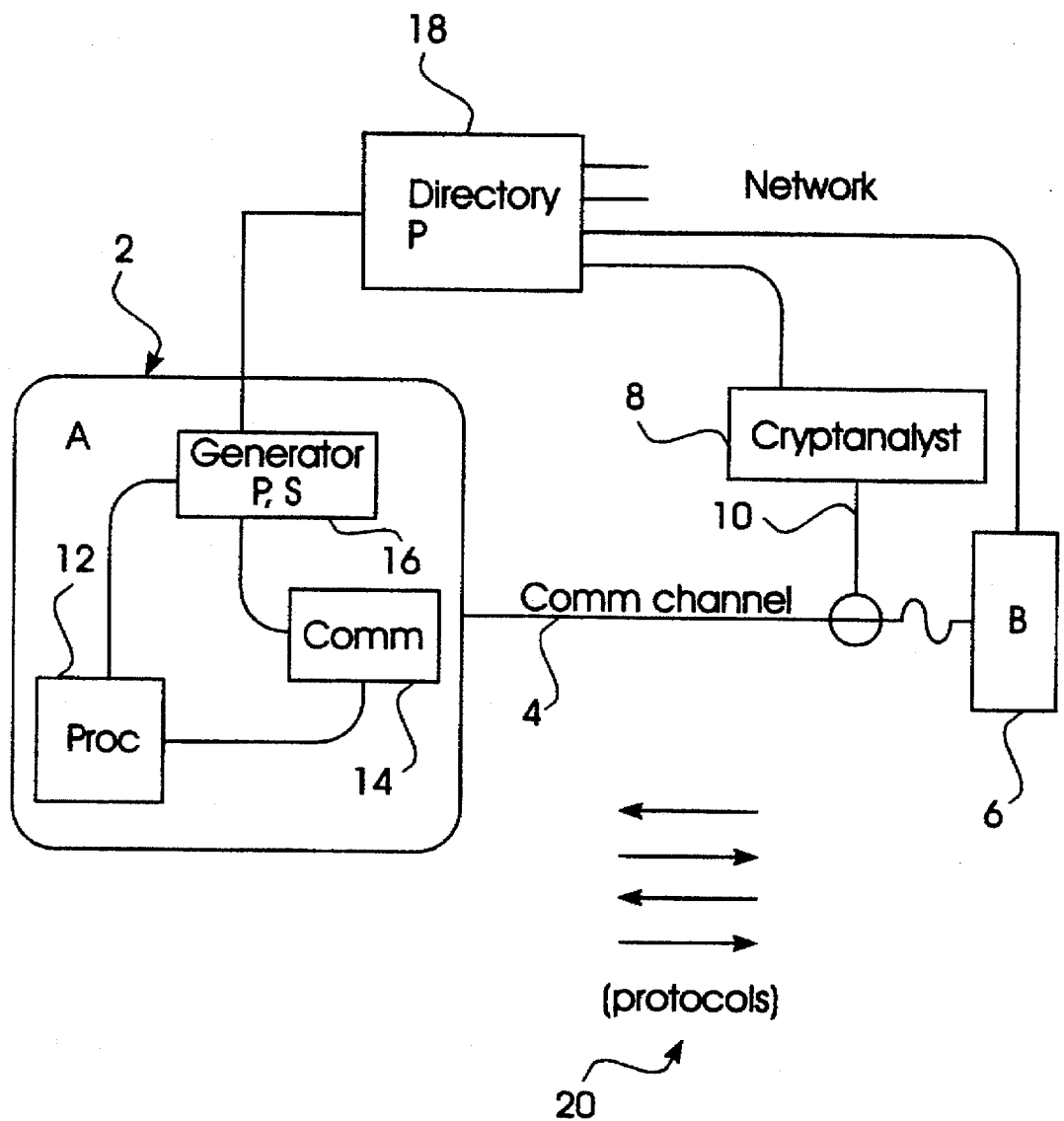
FIG. 1 is a block diagram of an encryption/decryption system architecture, showing its environment of operation, in accordance with the invention.

FIG. 1 shows a high-level block diagram of a cryptosystem according to the invention. The environment in which the cryptosystem preferably operates is also shown.

The description which follow will focus primarily on a system, shown generally as 2. In accordance with usage commonly known in the field, the system 2 will also be referred to as "Alice" or "A". In operation, the A system 2 communicates over a communication channel 4 with another system 6, which, as per standard usage in the field, is referred to as "Bob" or "B".

The communication channel 4 is open to access by other parties. It is anticipated that an eavesdropper, or cryptanalyst, 8, may attempt to monitor or interfere with the communication between the A system 2 and the B system 6, using eavesdropping equipment shown schematically as 10.

The A system 2 is shown schematically as typically including a processor 12 and a communication interface 14, for communicating over the channel 4. In accordance with the invention, the A system 2 further includes a key generator 16, which generates public and private keys for use in encrypted communications in a fashion described in detail below. The generator 16 generates public and private keys, shown as P and S, respectively. The secret key S is maintained in private, but the public key P is made generally available, such as by being placed into a publicly accessible directory 18. As shown, other parties, including the B system 6 and the cryptanalyst 8, have access to the directory 18, and can obtain the public key P.

In accordance with the invention, various cryptographic protocols are performed between A and B. These protocols are described in detail below. For the present high-level illustration, the protocols are shown schematically as a sequence of arrows 20 going back and forth over the channel 4.

INTRODUCTION TO THE LATTICE PROBLEM

The formal definition of a lattice will be given first, and then a discussion will be given of the nature of the difficult-to-solve problems which follow from the definition.

A lattice is a set of points in an n-dimensional Euclidean space, or, alternatively, a set of vectors from the origin of the coordinate system to the points in the space. The number of points making up the lattice is infinite, but the points are at discrete locations; that is, individual points of the lattice occur at intervals in the space, rather than being contiguous in line segments, etc. Thus, this definition comports with the intuitive notion that a lattice is made up of an array of points in rows, etc.

Moreover, the notion of some sort of a regular distribution of points, that also comes from the intuitive notion of a lattice, also follows from the mathematical definition of a lattice. That definition continues as follows.

A set of linearly independent vectors $a_1, \ldots, a_n$ is defined, or given, in the n-dimensional Euclidean space. These vectors may be visualized, in the n-dimensional space, as originating from a point of origin of an n-dimensional coordinate system. The set of vectors $a_1, \ldots, a_n$ is referred to as the "basis" of a lattice. The lattice itself is designated $L(a_1, \ldots, a_n)$.

Where the basis vectors of a lattice are given, a lattice point is obtained by scaling each of the basis vectors by an integer, and then adding the scaled basis vectors to produce a composite vector. That composite vector runs from the origin to the lattice point. Thus, a given lattice point may be mapped to an ordered set of the n integers, designated $k_1, \ldots, k_n$, which were used to scale the n basis vectors. The vector specifying that point of the lattice is a composite vector made up of the sum of the respective scaled basis vectors $a_i k_i$, where $1 \leq i \leq n$.

The overall lattice is the set of all such sums of scaled basis vectors, for all possible combinations of integral scaling values $k_1, \ldots, k_n$.

Because all integral values may be used to scale each of the n basis vectors to produce valid lattice points, the total number of points is infinite. However, a representative subset of the points, such as those within a given Euclidean distance of the origin, may be sufficient to reveal a regularity in the spacing of the lattice points. A given lattice may be specified, then, by specifying the coordinates of individual points, or alternatively by specifying the set of basis vectors.

Given a sufficient number of lattice points, it is possible to deduce a set of basis vectors for the lattice. However, the difficulty of finding a basis increases if a requirement is made that the length of the basis (that is, the maximum of the lengths of the basis vectors) is as small as possible. It should be understood that, for a sufficiently large number n of dimensions, the problem of deducing a set of short basis vectors, given the coordinates of a subset of the points, becomes very difficult to solve. Accordingly, where short vectors are sought, the desired vector length is given in terms of the number n of dimensions, preferably as a polynomial expression in n.

Some, but not all, lattices may be specified by a set of basis vectors which are orthogonal. For instance, if each basis vector is a unit vector in one of the dimensions of the space, then clearly the basis vectors are orthogonal.

However, even if a given lattice can have a basis of orthogonal vectors, the basis vectors making up the possible bases for the lattice need not all be orthogonal. For instance, it can be shown that, if a given set of orthogonal basis vectors produce a given lattice, then the same lattice may be produced from an alternate set of basis vectors, wherein one of the alternate basis vectors is a linear combination of the original basis vectors.

Thus, even if it is possible to deduce a set of basis vectors from a subset of lattice points, that basis is not necessarily the same set of short basis vectors from which the lattice was produced. Moreover, as the number of dimensions grows, deriving any basis at all, which meets a given threshold of shortness, for a given lattice becomes a very difficult task.

LATTICE-RELATED DIFFICULT PROBLEMS USED IN A PREFERRED EMBODIMENT OF THE INVENTION

Given this definition of a lattice, there are certain difficult-to-solve lattice-related problems that have suggested themselves to mathematicians studying the field. The notion of "cases", either average or worst, applies to the lattice problems in the sense that each different lattice, i.e., each different set of lattice points/vectors or each different set of basis vectors, represents a distinct case. It is provable that the lattice-related problems given here are as difficult as a worst-case difficult problem.

These lattice-related problems are listed here.

(P1) Find the length of a shortest nonzero vector in an n-dimensional lattice, approximately, up to a polynomial factor.

This problem has to do with the set of vectors which make up the lattice.

The study of the problem of finding short vectors in lattices has started by the famous French mathematician Dirichlet in 1842. After the fundamental works of Minkowski in 1896 the related field, known as the "Geometry of Numbers," became an independent branch of mathematics with a huge literature.

(P2) Find the shortest nonzero vector in an n-dimensional lattice L where the shortest vector v is unique in the sense that any other vector whose length is at most $n^c \|v\|$ is parallel to v, where c is a sufficiently large absolute constant.

(P3) Find a basis $b_1, \ldots, b_n$ in the n-dimensional lattice L whose length, defined as $\max_{i=1}^{n} \|b_i\|$, is the smallest possible up to a polynomial factor.

These three worst-case problems are some of the central questions of the field of lattices. Their roots go all the way back to the time of the early foundational work, referred to above. The problems have also received much attention recently, from a more modern algorithmic point of view particularly after the results of A. K. Lenstra, H. W. Lenstra, and L. Lovasz in 1982. These results are discussed in Groetschel et at., "Geometric Algorithms and Combinatorial Optimization," (2d corrected ed.), New York et at.: Springer-Verlag (1988, 1993), pp. 133–156.

DETAILED DESCRIPTION OF CRYPTOGRAPHY ACCORDING TO THE INVENTION

The invention may broadly be stated as including a cryptographic system and method based on a problem which is difficult to solve in the worst case. A preferred class of embodiments of the invention employ the three problems given above, pertaining to short vectors in lattices.

First, a description is given of what the protocols accomplish (from the point of view of users) then we give the detailed mathematical description of the protocols. There are known protocols that accomplish the same tasks. In accordance with the invention, however, the protocols, employing worst-case problems, provide superior security based on mathematical assumptions which are newly applied to this field, and essentially different from any assumptions conventionally used in cryptographic systems.

In the following description of the protocols, as per common practice, two parties are communicating, and they are designated Alice (or A) and Bob (or B).

(A) SUMMARY OF PROTOCOLS

The protocols are summarized below. More detailed descriptions of the protocols are given farther below, with reference to the flowcharts in FIGS. 2 through 7. The flowcharts are made up to illustrate both cryptographic participants, Alice and Bob, and to show their activities and the communications that take place between them.

PROTOCOL 1 (IDENTIFICATION)

This protocol is a "public key" identification system, for allowing a first user (e.g., Alice or party A) to identify herself to a second user (e.g., Bob or party B).

Each party in the system publishes a key P. The published public key is chosen by each party privately according to a protocol. P(A) is the key of party A. The public keys are published in a directory, like a phone book, and they are accessible by everybody.

When A generates her key P(A), she also generates secret information S(A). A keeps S(A) secret.

In accordance with the invention, the public and private keys are based on information which, to a cryptanalyst, would be as difficult to obtain as the solution to a worst-case problem. Preferably, the information is based on one of the lattice problems given above. For instance, of (P1) is used, then Alice generates a lattice and a short vector, publishes the lattice as P(A) in the directory, and keeps the short vector a secret as S(A).

If A wants to send a message to B, then she will be able to prove her identity in the following way: B gets A's public key P(A), that is, the lattice, from the public directory. Then, depending on it, he asks A questions.

Using her secret information S(A), A is able to give satisfactory answers to these question. Thus, after this communication, B will be sure the he is getting the messages from A.

In accordance with the invention, the system is constructed in a way that, assuming the hardness of the worst-case problem, nobody else is able to give satisfactory answers. For instance, where (P1) is used as described above, B's inquiry to A includes an inquiry about a short vector for the lattice included in P(A). A responds to the inquiry with the short vector, S(A). B then verifies that the vector he has received from A is in fact a short vector for the published lattice. Since the difficulty of deriving a suitably short vector from the lattice is sufficiently great, the fact that the vector is a short vector for the published lattice verifies the identity of A, who sent the short vector.

It will be seen that, once the short vector has been used once to identify A, this particular case of the short vector problem is no longer private. However, because the short vector problem is provably as difficult as a worst-case problem, other cases may be used subsequently, providing the same level of security.

PROTOCOL 2 (BIT COMMITMENT)

Alice chooses a 0, 1 value x, but she does not communicate her decision to Bob, only sends him a message f(x), which depends on x. From f(x), Bob does not get any information about the value of x. Later, Alice may or may not reveal the value of x. However, if she reveals it, then she cannot cheat. That is, she is not able to find another y, different from x, such that f(x)=f(y).

This protocol is used in protocol 1, and it is also a general building block of many cryptographic protocols.

PROTOCOL 3 (COLLECTIVE COIN FLIPPING)

With this protocol two parties are able to decide collectively the value of a random 0, 1 bit, in a way that none of them can cheat the value will be truly random taking the 0, 1 values with probabilities ½, ½. More precisely the two parties has to follow a protocol. There are certain steps in the protocol, where the parties can check whether the other one follows the protocol. We assume that neither of them cheats at these steps. (In such a case the other party may terminate the communication.) There are also steps in the protocol that the parties are performing privately. It may happen that in this case one of the parties does not follow the protocol (cheating). Our protocol has the property that if at least one party follows the rules of the protocol then the result will be a truly random bit. Therefore any of the two parties can ensure a truly random outcome, even if the other party is cheating.

This protocol is used in Protocol 1, and collective coin-flipping is a general building block of many cryptographic protocols.

PROTOCOL 4 (SAFE TRANSFER OF SECRET KEYS)

In Protocol 1 each party has a secret key which enables her to prove her identity. By the present protocol, this can be transferred to another party in a way that a third party cannot reconstruct the secret key even if gets all of the messages of the transfer.

PROTOCOL 5 (DIGITAL SIGNATURE)

It will sometimes be the case that a cryptographic protocol places a limitation of the size of a message that it can handle at a time. Protocol 5 deals with this situation. The messages is subdivided into blocks of a suitably smaller size. The blocks are then treated, for the most part, as separate messages. However, information relating to the number and sequence of the blocks is also sent, so that the recipient can tell (i) whether all blocks have been received, and (ii) in which order the blocks should be placed, to restore the complete message. The use of a digital signature facilitates this.

(B) APPLICATION OF THE LATTICE PROBLEMS TO CRYPTOGRAPHIC PROTOCOLS

The invention is embodied, as shown and described in detail herein, in any one of several cryptographic protocols. The protocols are related, in that their security depends on the hardness of some respective worst-case problems. Preferably, the worst-case problems are related to the short vector problem in lattices. Accordingly, the protocols will be described in terms of the lattice-related problems discussed above. However, it will be understood that other such problems may also form the basis for implementations of the protocols within the spirit and scope of the invention.

(1) NOTATION USED IN CONNECTION WITH THE INVENTION (1.) If 1 is a natural number, then $I_l$ denotes the set $0, \ldots, 1-1$.

(2.) $R^n$ denotes the Euclidean space of the real vectors $<x_1, \ldots, x_n>$, and $Z^n$ is the subset of $R^n$ consisting of all vectors with integer coordinates. $e_i$ will denote the i-th unit vector.

(3.) If H is a positive real number and is a vector, where $u \in R^n$, then the expression Cube(u,H) denotes the set $$\left\{ u + \sum_{i=1}^{n} \lambda_i He_i | 0 \leq \lambda_i < 1; i = 1, \ldots, n \right\}$$

The protocols will depend on the choice of four positive integers n, M, K, l, and a real number p. The values of these parameters are chosen with certain properties. For the description of these properties, random variables are defined, which will be used in the protocols, as well. In the definition of the random variables it is assumed that the values n, M, K, and l are fixed.

(4.) $\Gamma(n,M)$ is a random variable having the following properties:

(G1) every value of $\Gamma(n,M)$ is an n-dimensional lattice L in $Z^n$, represented by a basis of length at most M, and with the property $$\sqrt{n} \, (det L)^{\frac{1}{n}} \leq \frac{K}{3n}$$

(G2) $\Gamma(n,M)$ can be generated by a polynomial time probabilistic algorithm, (G3) If L is a random value of $\Gamma(n,M)$, then there is no polynomial time probabilistic algorithm which finds a vector shorter than $\sqrt{n}K$ in L with a probability greater than p where the probability is taken both for the randomization of $\Gamma(n,M)$ and the probabilistic steps of the algorithm.

(G4) There is an efficient probabilistic algorithm which given any value L of $\Gamma$ as an input produces an element of $L \cap$Cube (0, 1K), whose distribution is almost uniform on $L \cap$(0, 1K).

$\Gamma'(n,M) = <\Gamma_1(n,M), \Gamma_2(n,M)>$ will be a random variable having the following properties:

(G5) $\Gamma'(n,M)$ satisfies the same conditions as $\Gamma(n,M)$, (G6) if L,B is a random value of $\Gamma'(n,M)$, then L is a lattice in $Z^n$ and B is a basis of L whose length is at most K/3n.

If $L \subseteq Z^n$ is an n-dimensional lattice, then a mod 2 linear functional is a homomorphism of the Abelian group L into the field with two elements. If L is an n-dimensional lattice, then there are $2^n$ distinct mod 2 linear functionals. Each mod 2 linear functional is uniquely determined by its values on the elements of any basis of L. Therefore, if a basis is fixed, then the functional can be easily represented by 0, 1 sequences of length n.

There are many possibilities to define the random variables $\Gamma$ and $\Gamma'$ with the required properties. In a preferred embodiment of the invention, these variables are defined based on the way of generating random lattices as described above. There is also given a possible choice for the value of the parameters n, M, K, l, and p. In this description, two absolute constants $c_1$ and $c_2$ will also be used. These constants are defined below, in connection with a formal definition of a random class of lattices to be used.

(2) THE DEFINITION OF THE RANDOM CLASS OF LATTICES

A lattice within the random class consists of vectors with integer coordinates. Moreover, these lattices are defined modulo q, where q is an integer depending only on n. The sense of this definition is that, if two vectors are congruent modulo q, then either both of the vectors, or neither of them, belong to the lattice.

Finally, the lattices of the random class are defined as the set of all sequences of integers of length m, where m depend, only on n, and where the sequences of integers are orthogonal to a given sequence of vectors $u_1, \ldots, u_m \, Z^m$ modulo q. More precisely if $v = <u_1, \ldots, u_m>$ where $u_i \in Z^n$, then let $\Lambda(v,q)$ be the lattice of all sequences of integers $h_1, \ldots, h_m$ so that $$\sum_{i=1}^{m} h_i u_i \equiv 0 (mod \, q)$$

where the mod q congruence of two vectors means that all of their coordinates are congruent. Every lattice in the random class will be of the form $\Lambda(v,q)$ for some v and for a single fixed q, depending only on n.

The definition of the random class depends on the choice of two absolute constants $c_1$ and $c_2$. If n is given, then let $m = [c_1 n \log n]$, and let $q = [n^{c_2}]$ (n raised to the power of $c_2$). For each n there is a single random variable $\lambda$ so that $\Lambda = \Lambda(\lambda,q)$ is a lattice with dimension m. (The existence of a polynomial time algorithm which finds a short vector in $\Lambda$ will imply the existence of such an algorithm which solves the mentioned problems in every lattice $L \subseteq R^n$).

The lattices of the above-defined random class are made up of vectors having integer coordinates. Moreover, these lattices are defined modulo q, where q is an integer depending only on n, in the sense that, if two vectors are congruent modulo q, then either both of them or neither of them belong to the lattice.

Finally the lattices of the random class will be defined as the set of all sequences of integers of length m, wherein m depends only on n, which are orthogonal to a given sequence of vectors $u_1, \ldots, u_m \in Z^m$ modulo q. More precisely, if $v = <u_1, \ldots, u_m>$ where $u_i \in Z^n$, then let $\Lambda(v,q)$ be the lattice of all sequences of integers $h_1, \ldots, h_m$, such that $$\sum_{i=1}^{m} h_i u_i \equiv 0 (mod \, q)$$

where the mod q congruence of two vectors means that all of their coordinates are congruent. Every lattice in this defined random class will be of the form $\Lambda(v,q)$ for some v and for a single fixed q (depending only on n).

It can be proven that there are absolute constants $c_1$, $c_2$, and $c_3$, so that the following holds:

Suppose that them is a probabilistic polynomial time algorithm A which, given a value of the random variable $\lambda_{nc1,c2}$ as an input, will output, with a probability of at least ½, a nonzero vector of $\Lambda(\lambda_{n,c1,c2},[n^{c2}])$ of length at most n. Then, there is a probabilistic algorithm B with the following properties:

If the linearly independent vectors $a_1, \ldots, a_n \in Z^n$ are given as an input, then B, in a time interval bound by a polynomial in $$\sigma = \sum_{i=1}^{n} size(a_i)$$

gives the outputs $z, u, <d_1, \ldots, d_n>$ so that, with a probability of greater than $1-2^{-\sigma}$, the following three requirements are met:

if v is a shortest nonzero vector in $L(a_1, \ldots, a_n)$, then $z \leq \|v\| \leq n^{c3}z$ (in this expression, n is raised to the $c_3$ power);

if v is an $n^{c3}$-unique (n raised to the $c_3$ power) shortest nonzero vector in $L(a_1, \ldots, a_n)$ then either $u=v$ or $u=-v$; and the set of vectors $d_1, \ldots, d_n$ is a basis with $\max_{i=1}^{n} \|d_i\| \leq n^{c3}bl(L)$ (again, in this expression, n is raised to the $c_3$ power).

As mentioned above, this definition of the random class depends on the choice of two absolute constant $c_1$ and $c_2$. If n is given, then let $m=[c_1 n \log(n)]$, and let $q=[n^{c_2}]$, that is, n raised to the power of $c_2$. For each n, there is given a single random variable $\lambda$ so that $\Lambda=\Lambda(\lambda,q)$ is a lattice with dimension m.

The existence of a polynomial time algorithm which finds a short vector in $\Lambda$ will imply the existence of such an algorithm which solves the mentioned problems in every lattice $L \subseteq R^n$.

(3) DEFINITIONS (a) DEFINITION OF $\Gamma(n,M)$

Let n be a positive integer. For larger numbers n, the protocol will be more secure. Generally n is considered secure if there is a positive integer r such that $n \geq c_1 r (\log(r))$, and such that there is no efficient algorithm which finds a short basis in any r dimensional lattice.

For the choice of the other parameters, one possibility is $M=q\sqrt{n}, K=n$, and $l=n^3 q$. The choice of p must depend on the assumption about the hardness of the problem of finding a short basis in any r-dimensional lattice. The connection between the hardness of this problem and the choice of p with property (G3), and an efficient algorithm required in (G4), follow from the above discussion of the lattice problem. A satisfactory choice is $p=n^{-d}$ where d is a large constant.

Let r be a positive integer so that $n \geq c_1 r (\log(r))$, and let $q=[r^{c_2}]$, where $c_1, c_2$ are absolute constants with the properties described above.

It is assumed that $M \geq q\sqrt{n}$. Let $u_0, \ldots, u_{r-1}$ be a random sequence whose elements are chosen independently, and which has uniform distribution from $I_q^r$. $\Gamma(n,M)$ will be the lattice consisting of all n-dimensional integer vectors $\langle h_1, \ldots, h_n \rangle$ with the property $$\sum_{i=0}^{r-1} h_i u_i \equiv 0 (\bmod\ q)$$

If a particular lattice L is defined this way, then it is easy, using the standard methods of linear algebra, to construct efficiently a basis of L of length at most M. That is, the lattice can be represented in the required form.

(b) THE DEFINITION OF $\Gamma'(n,M)$

The choice of the parameters is almost the same as in the case of $\Gamma$, except for the following differences. It is assumed now that $c_1, c_2$ are chosen in such a way that there is no efficient algorithm which finds a vector of length at most $n^3$ in the random lattice. It is also assumed that q is an odd integer $K=r^3$.

Every value of $\Gamma'(n,M)$ will be a pair L,B, where $L \subseteq Z^n$ is a lattice, and B is a basis of L shorter than $K/(3n)$. The lattice L itself will be represented by another basis of length at most M.

A probabilistic algorithm generates a pair L,B, with these properties, such that the distribution of L is very close to the distribution of the lattice given by $\Gamma(n,M)$.

The lattice L is defined, first by constructing a basis D of length at most $K/3n$. Once L is defined, it is represented as the lattice of integer sequences of length n orthogonal mod q to a sequence of vectors $u_0, \ldots, u_{n-1}$, where $0 \leq u_i < q$, and $i=0, \ldots, n-1$ in $Z^r$. For a fixed L the vector sequence $u_0, \ldots, u_{n-1}$ may be chosen at random from the set of all sequences satisfying these conditions. From $u_0, \ldots, u_{n-1}$, the basis D of L is obtained, in the same way as the basis of L was constructed in the definition of $\Gamma$.

First a set $B_1$ is given, of only n-r linearly independent vectors, each of length at most $K/(3n^2)$, Then a set $B_2$ is constructed, consisting of r linearly independent vectors, each of length at most $K/(3n^2)$.

L is the lattice generated by $B_1 \cup B_2$, and all of the vectors $qe_i$, for $i=1, \ldots, n$. The basis B of L can be efficiently constructed from the n linearly independent vectors of $B_1 \cup B_2$, so that the length is increased only by a factor of n.

In the following description, an i-by-j matrix has i rows and j columns. The rows of the matrix will be numbered from 0 to i-1, and columns from 0 to j-1.

The n-r vectors of $B_1$ will be given as the rows of a matrix A with n-r rows and n columns, whose entries are elements of $I_q$. The first r column of the matrix A (an n-r by r matrix) will be denoted by $A_1$. The remaining columns form a square (n-r by n-r) matrix, denoted $A_2$. Let $\mu=[\log_2 q]+2$.

(c) DEFINITION OF $A_1$

The i-th element of the $\mu$-th row is 1 for $i=0, \ldots, r-1$, and all of the other terms of the matrix $A_1$ are 0.

(d) DEFINITION OF $A_2$

The matrix $A_2$ is defined as $A_2=BC$, where B, C are (n-r)-by-(n-r) matrices. The definition of the matrix B will be given in a concise and constructive form below. First, a description will be given of the motivating ideas behind the construction.

The randomization of B and C will start with the randomization of r vectors $u_0, \ldots, u_{r-1} \in I_q^r$ independently and with uniform distribution. B and C depend on these vectors.

The distribution of A is determined by the distributions of B and C. The crucial property of A is that, if the matrix equation $AY=0$ is solved, where Y is a matrix with n rows and r columns whose first r rows are the vectors $u_0, \ldots, u_r$, and the terms in whose remaining rows are unknown, then the solution has an almost uniform distribution modulo q.

It follows from this property that the lattice defined by the basis B has almost the same distribution as the lattice L in the definition of $\Gamma$. Note that the rows of Y will be $u_0, \ldots, u_{n-1}$ if the least nonnegative residues of the entries of Y modulo q are taken.

Moreover the n-by-n matrix A' which is obtained from A by appending the r vectors of $B_2$ as the last r rows, will have a diagonal whose each entry is 1, while all entries outside this diagonal are even integers. This ensures that the vectors of $B_1 \cup B_2$ are linearly independent over R. $B_2$ is constructed so that $A'Y=0$. Therefore the rows of $B_2$ are elements of the lattice L.

To this end, B, C are defined to have the properties listed below. It is assumed that the vectors $u_0, \ldots, u_{r-1}$ have been already randomized. U will denote the (n-r)-by-r matrix, whose first r rows are $u_0, \ldots, u_{r-1}$, and all of whose other entries are 0.

Let us consider first the matrix equation $BX=U$, where X is an (n-r)-by-r matrix whose elements are unknowns. The matrix B is constructed with the following properties:

(B1) B is a lower triangular matrix with 1's in the main diagonal. It is assumed that the rows of the unique solution of $BX=-U$ are the r-dimensional integer vectors $\xi_0, \ldots, \xi_{n-r-1}$.

(B2) $\xi_{ip+j} = -2^j u_i$ for $i=0, \ldots, r-1$, and for $j=0, \ldots, \mu-1$.

(B3) $2\xi_{r\mu+k} \equiv -u_k \bmod q)$ $k=0, \ldots, r-1$.

(B4) for any fixed $u_0, \ldots, u_{r-1}$, the distribution of $\xi_{(r+1)\mu}$, $\xi_{(r+1)\mu+1}, \ldots, \xi_{n-r-1}$ (with respect to the randomization of B), is uniform modulo q on the set of all r dimensional vector sequences of length n-r-(r+1)$\mu$.

(B5) every entry of B in the main diagonal is 1, and all of the other entries are even integers.

(B6) each entry is in the interval [0,2r].

Note that the property (B1) implies that the vectors $\xi_i$, where $i=0, \ldots, n-r-1$, can be determined by recursion on i. This recursion will show that the matrix really satisfies the conditions formulated above.

Assume now that B is fixed with the required properties, and that the rows of the matrix $-B^{-1}U$ are $\xi_0, \ldots, \xi_{n-r-1}$. The matrix C will then be constructed so that the following conditions are satisfied:

(C1) C is an upper triangular matrix with 1's in the main diagonal.

Assume that the rows of the unique solution of $CX = -B^{-1}U$ are the r-dimensional integer vectors $\rho_0, \ldots, \rho_{n-r-1}$.

(C2) $\rho_i = \xi_i$ for all $i > [n-r/2]$.

(C3) for almost all fixed $u_0, \ldots, u_{r-1}$, and $\xi_0, \ldots, \xi_{n-r-1}$ (according to the distribution of B), the distribution of $\rho_0, \ldots, \rho_{[n-r]/2]}$ is almost uniform modulo q on the set all of all r dimensional vector sequences of length $[(n-r)/2]+1$.

(C4) every entry of C in the main diagonal is 1, and all of the other entries belong to the set $\{0,2\}$.

(C5) if $u_0, \ldots, u_{r-1}$, B, and C are all randomized, then the distribution of $u_0, \ldots, u_{r-1}, \rho_0, \ldots, \rho_{n-r-1}$ is almost uniform modulo q on the set of all vector sequences of length n.

(e) DEFINITION OF B

For the definition of B, there will first be defined a random variable $\eta$ whose values are sequences of integers $x_0, x_1, \ldots, x_{\mu-1}$, so that $0 \leq x_i < 2r$ for all $i=0, \ldots, \mu-1$. $\eta$ is chosen so that the number $$\sum_{i=0}^{\mu-1} x_i(2r)^i$$

has uniform distribution on the interval $[0, q-1]$. Such an $\eta$ can be efficiently generated by randomizing first the value of $$\sum_{i=0}^{\mu} x_i(2r)^i$$

and then determining the unique values of the numbers $x_i$.

The element of the matrix B in the i-th row and j-th column will be denoted by $b_{ij}$. Then, $b_{ij}=1$ for all $i=0, 1, \ldots, n-r-1$. For all $j=\mu i+k$, where $i=0, \ldots, r-1$, and $k=1, \ldots, \mu-1$, it will be the case that $b_{j,j-1}=2r$.

For all $j=\mu r+k$, where $k=0, \ldots, r-1$ and $i=0, 1, \ldots, \mu-1$ it will be the case that $b_{j,k\mu+i}=2\alpha_i$, where $$\sum_{s=0}^{\mu-1} \alpha_s(2r)^s = z$$

where $0 \leq z \leq q$, and where $4z \equiv 1 \pmod{q}$, and where $0 \leq \alpha_s < 2r$ are integers for $s=0, \ldots, \mu-1$.

For all $j > (\mu+1)r$ and $i=0, \ldots, r-1$ the sequence of entries $b_{j,\mu i}, b_{j,\mu i+1}, \ldots, b_{j,\mu i+\mu-1}$ will be a random value of the random variable $2\eta$. (For all of the possible values of j and i, the values of the random variable $\eta$ are taken independently.)

Every other entry of B is 0.

(f) DEFINITION OF C

The variable $c_{ij}$ will denote the j-th element of the i-th row in the matrix C. The terms $c_{i,i}=1$ for all $i=0, 1, \ldots, n-r-1$.

The entries $c_{ij}$, where $i \leq [(n-r)/2]$, and $j > [(n-r)/2]$, are taken independently and with uniform distribution from the set $\{0,2\}$.

Note that the definition of C and property (B3) together imply that $$2\left(\rho_j + \sum_{i \neq j} c_{ij}\rho_i\right) \equiv -u_j \pmod{q}$$

for $j=0, \ldots, r-1$. This makes it possible to add r more rows to the matrix A (containing the vectors of $B_2$), so that, for the extended matrix A', it is the case that $A'W \equiv 0 \pmod{q}$, where W is the matrix whose rows are $u_0, \ldots, u_{r-1}, \rho_0, \ldots, \rho_{n-r-1}$, and the rank of A' (over the rationals) is n.

(g) DEFINITION OF $B_2$

The rows of $B_2$ are the n-dimensional vectors $g_j$, where $j=0, 1, \ldots, r-1$, defined in the following way. Let $g'_j$ be the vector $<2c_{j,0}, \ldots, 2c_{j,n-r-1}>$, where $c_{j,i}$ are the entries of the matrix C. Let $e_j^{(r)}$ be the the r-dimensional j-th unit vector. Then, $g_j$ is the juxtaposition of $e_j^{(r)}$ and $g'_j$. That is, the first r coordinates of $g_j$ are the coordinates of $e_j^{(r)}$, and the last n-r coordinates of $g_j$ are the coordinates of $g'_j$.

(C) APPLICATION OF THE INVENTION (EMBODIED IN THE LATTICE PROBLEMS) TO THE PROTOCOLS

The above description of the cryptographic protocols will be generally familiar and comprehensible to a person skilled in the art of cryptography, and particularly, to a person familiar with the public key cryptosystems pioneered by Diffie et al., and by Rivest et al.

However, in accordance with the invention, the random variables $\Gamma$ and $\Gamma'$ used in the protocols (as described below) are defined using a worst-case problem, as for instance using the lattice problems, to provide the enhanced security discussed above.

PROTOCOL 1 (IDENTIFICATION)

A simple implementation of the above-summarized identification protocol, utilizing the lattice probiels according to the invention, is as follows:

First, Alice generates a lattice, and identifies a short vector solution, say, to problem 1 (above). Alice publishes the lattice as a public key. Then, in the course of communication, Alice establishes her identity by revealing the short vector.

A protocol performed in this straightforward manner works for this one instance, but has the drawback that it reveals the short vector. Therefore, it cannot be used more than once. However, a more elaborate treatment of a short vector-bases approach is repeatable.

Protocol 1 is used as a portion of protocol 3, and will be described in detail, along with its flowcharts, as part of the description of Protocol 3, below.

PROTOCOL 2 (BIT COMMITMENT)

Figure 2:
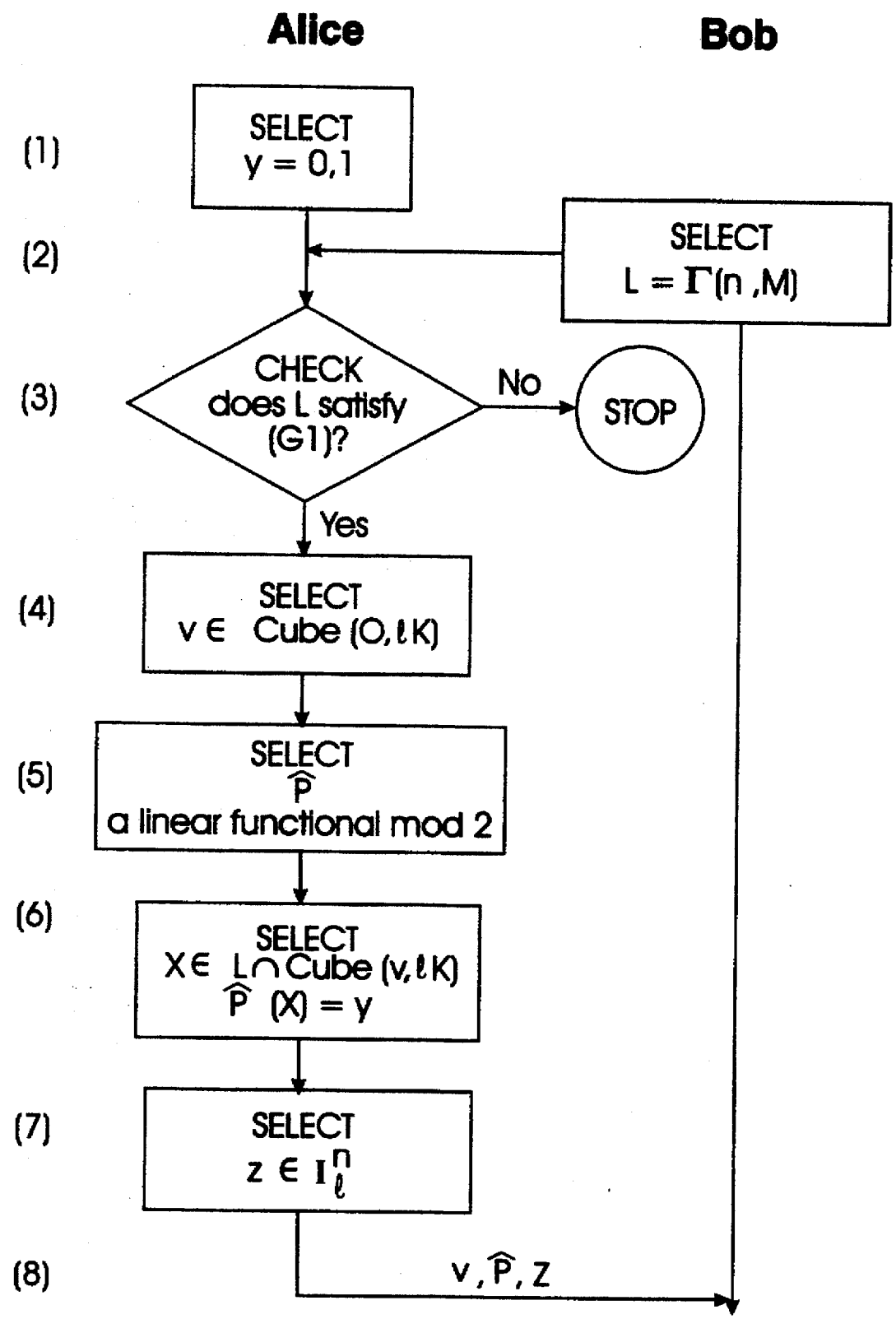
FIGS. 2 and 3 together make up a flowchart illustrating the operation of a cryptosystem according to the invention, for executing a bit commitment protocol.
Figure 3:
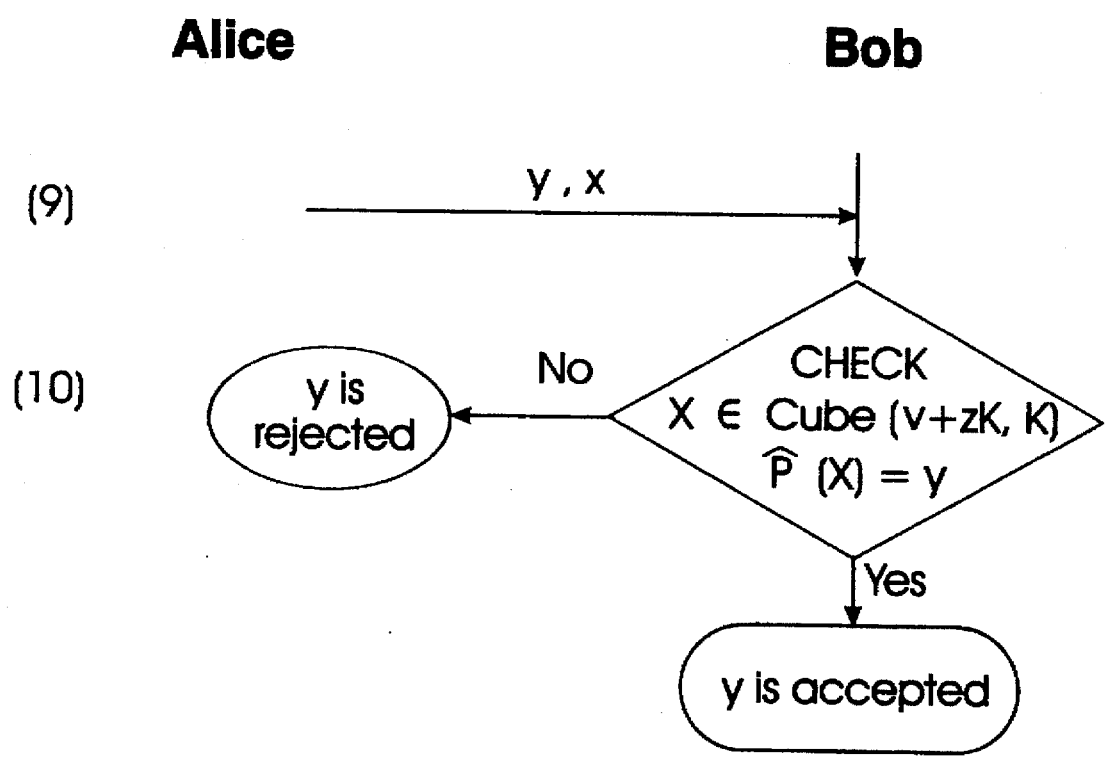
Figure 4:
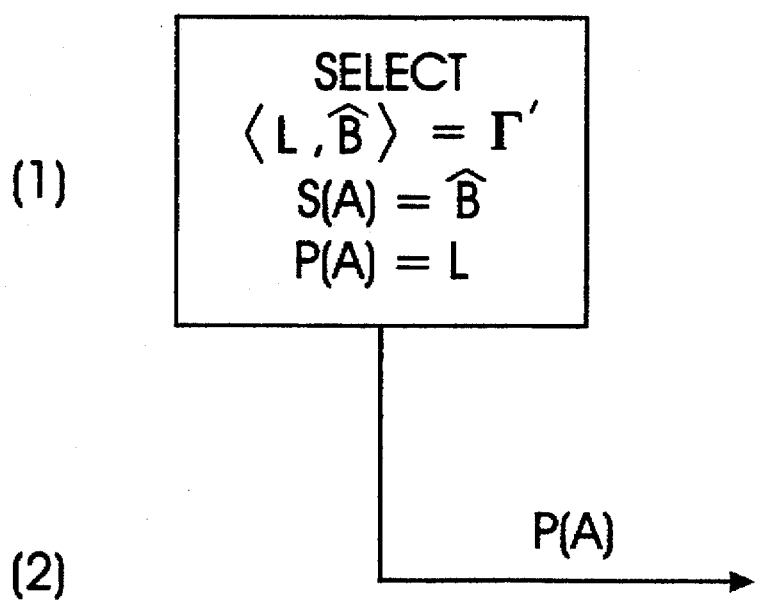
FIGS. 4 and 5 together make up a flowchart illustrating the operation of a cryptosystem according to the invention, for executing an identification protocol.
Figure 5:
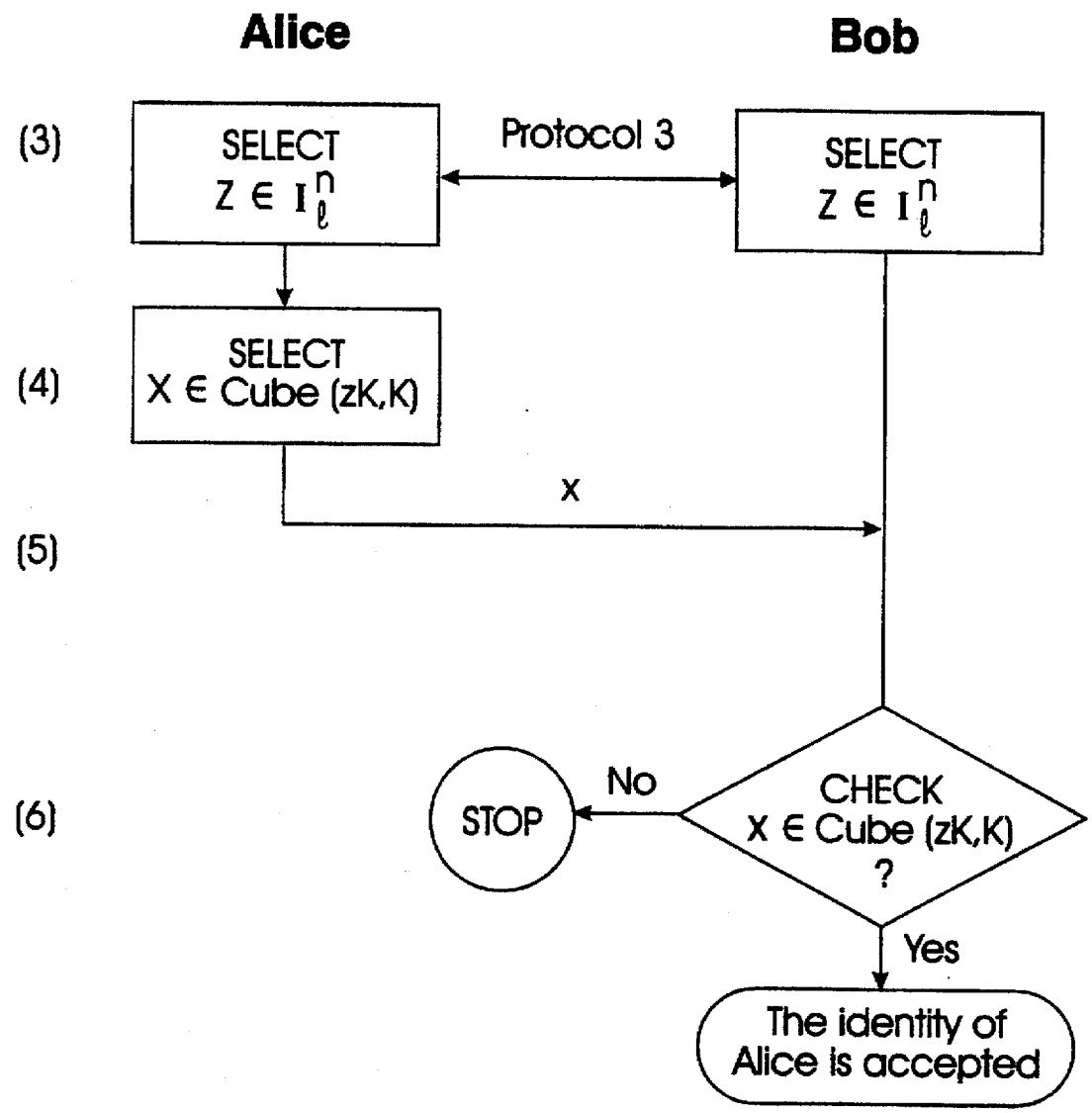

This protocol is illustrated in flowchart form in FIGS. 2 and 3, which, taken together, make up a flowchart showing both Alice and Bob. Individual steps within the flowchart are numbered in accordance with the parenthetical numbers given in the description which follows.

PHASE 1 (FIG. 2)

(step 1) Alice chooses a 0, 1 bit y.

(step 2) Bob picks a random value L of $\Gamma(n,M)$, and sends L to Alice.

(step 3) Alice checks whether L meets the requirements of (G1). If L does not, then Alice terminates the protocol.

(step 4) Alice picks a random vector v from Cube(0,1K) having uniform distribution.

(step 5) Alice picks a random mod 2 linear functional P.

(step 6) Alice picks a random point $x \in L \cap Cube(0, 1K)$ having uniform distribution, and with the condition P(x)=y.

(step 7) Alice determines the unique vector $z \in I_1^n$ with $x \in Cube(v+zK,K)$.

(step 8) Alice sends v, P, and z to Bob.

This ends the first phase of the protocol. Later if Alice wants to reveal y then Alice and Bob proceed with Phase 2 of Protocol 2, as follows:

PHASE 2 (FIG. 3)

(step 9) Alice sends y and x to Bob, (step 10) Bob checks whether $x \in Cube(v+zK,K)$ and $P(x_i)=y$. If both of these conditions are so, then Bob accepts that y was the bit chosen by Alice.

Before Phase 2, Bob can guess what is y with a probability of at most $\frac{1}{2}+\epsilon$ where $\epsilon > 0$ is a small constant The term $\epsilon$ can be decreased if Alice picks t random bits $y_1, \ldots, y_t$, with the condition $y_1 + \ldots y_t = y$, and commits herself to each $y_i$ separately using the already described protocol. If t is sufficiently large, say, if t=n, then the probability that Bob's guess is right will be at most $\frac{1}{2} + \delta$, where $\delta > 0$ is exponentially small in n.

With regard to Protocol 2, the following remarks are made: First, in this protocol, there are steps when the parties are working with vectors whose components are random real numbers. The actual computation should preferably be performed on rational numbers which approximate the real numbers. The randomization may also be performed on a finite set of rational numbers with the induced distribution.

Secondly, the random choice made by Alice in step (6) can be efficiently done in a manner as stated here (proof omitted), so that the resulting distribution is almost uniform in the sense described in connection with step (6):

For all $c_1 > 0$, there is a $c_2 > 0$ so that the following holds: Assume that $d_1, \ldots, d_n$ are linearly independent vectors in $Z^n$, that $\sigma \geq n$, and that $a_1, \ldots, a_n \in L = L(d_1, \ldots, d_n)$ is a set of linearly independent vectors as well, with $$\max_{i=1}^{n} \|a_i\| \leq 2^{\sigma^{c_1}}$$

and $$\max_{i=1}^{n} \|d_i\| \leq 2^{\sigma^{c_1}}$$

Suppose further that $\mu_1, \ldots, \mu_n$ are independent random variables which take their values with uniform distribution on the integers in the interval $$[0, 2^{\sigma^{4 c_1}}]$$

Let $$\chi = \left( \sum_{i=1}^{n} \mu_i d_i \right) (\bmod \ a_1, \ldots, a_n)$$

Then the distribution of $\chi$ on the points of $L \cap P(a_1, \ldots, a_n)$ is almost uniform in the following sense:

if, for each $v \in P(a_1, \ldots, a_n)$, $p_{84} = P(\chi = v)$ and k is the number of lattice points in $P^-(a_1, \ldots, a_n)$, then $$\sum_{v \in P^-(a_1, \ldots, a_n)} \left| p_v - \frac{1}{k} \right| \leq 2^{-\sigma^{c_1}}$$

This approximation does not affect the correctness and security of the protocol. A similar approximation may be used, as well, in the other protocols described herein.

PROTOCOL 3 (COLLECTIVE COIN FLIPPING)

Protocol 3 preferably includes Protocols 2 and 1, along with certain additional steps. The preferred embodiment of Protocol 3 will be described here, as including the relevant sections of Protocols 2 and 1. Since Protocol 2 has already been described above in connection with FIGS. 2 and 3, and Protocol 1 is given here in connection with FIGS. 4 and 5, it is believed that Protocol 3, largely comprising these other protocols, is adequately described through references to the other protocols.

Using Phase 1 of Protocol 2, Alice commits herself to a bit y chosen at random by her. Then the following additional steps are performed:

(1) Bob chooses a random bit z an sends it to Alice.

(2) Using Phase 2 of protocol 2, Alice reveals y.

(3) The EXCLUSIVE OR of y and z is the commonly chosen random bit.

Next, Protocol 1 is executed, as follows:

PROTOCOL 1 (AS EXECUTED WITHIN PROTOCOL 3)

PHASE 1 (FIG. 4)

If Alice is a party participating in the protocol, then she chooses her public key P(A) and secret key S(A) in the following way:

(step 1) Alice picks a random value <L,B> of $\Gamma^u$. Her secret key S(A) will be B, and her public key P(A) will be L.

(step 2) Alice publishes her public key P(A), that is, makes it available to anybody who may want to communicate with her.

This ends the first phase of Protocol 1. Later on, if Bob wants to communicate with Alice, then Phase 2 is used. (For Protocol 1, it is irrelevant whether Bob has a public key.)

PHASE 2 (FIG. 5)

(step 3) Using Protocol 3, Bob and Alice are repeatedly choosing random 0, 1 bits, and with their help they generate a random $z \in I_1^n$ with uniform distribution.

(step 4) Alice generates an element x of Cube(zK,K), using B, the short basis of L, given by her secret key.

(step 5) Alice sends x to Bob.

(step 6) Bob verifies whether x is really an element of Cube(zK, K). If so, then Bob accepts that he is communicating with Alice.

PROTOCOL 4 (SAFE TRANSFER OF SECRET KEYS)

Figure 6:
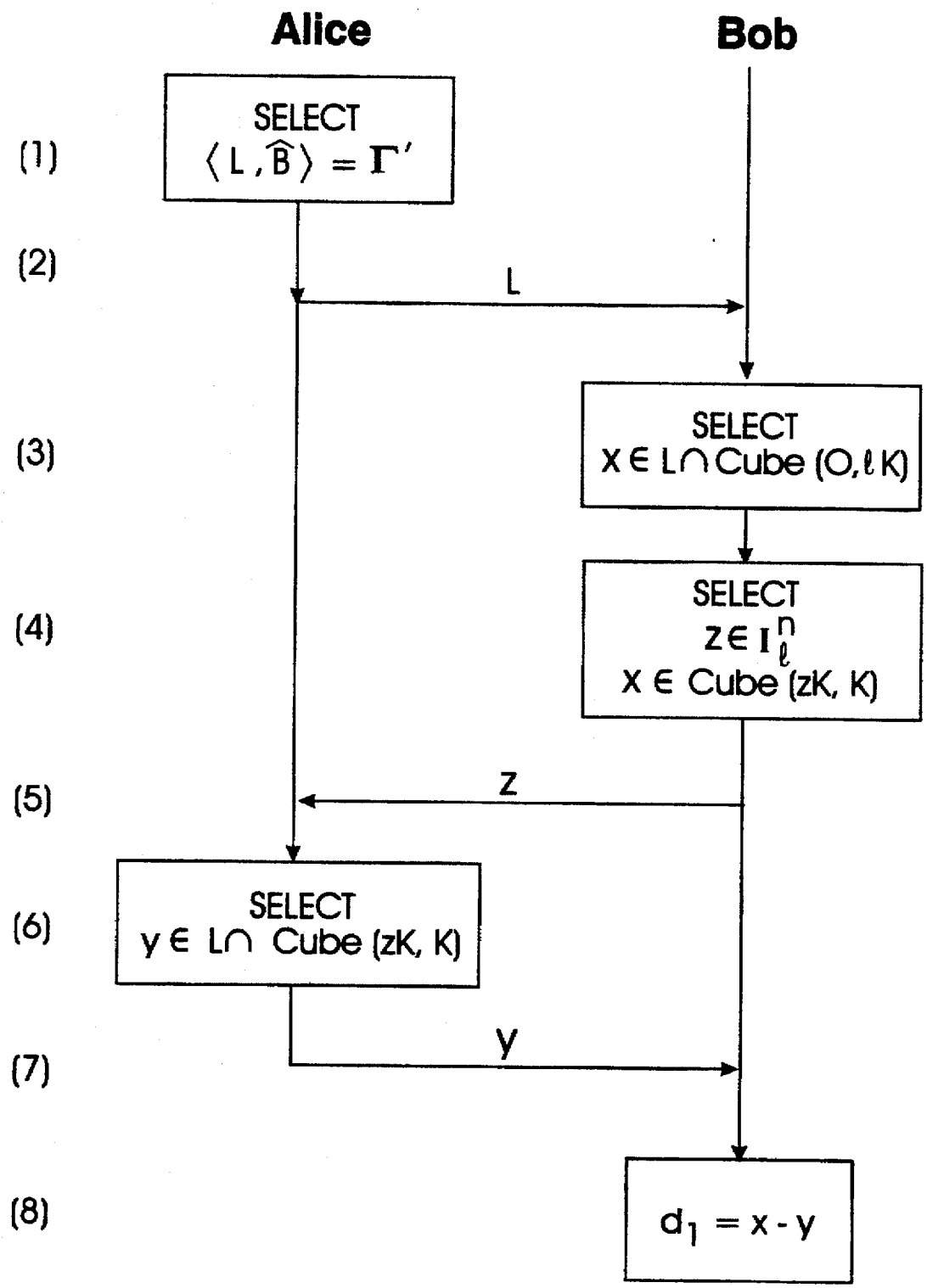
FIG. 6 is a flowchart illustrating the operation of a cryptosystem according to the invention, for executing a protocol for safe transfer of secret keys.

This protocol is illustrated in the flowchart of FIG. 6. The steps are as follows:

(step 1) Alice picks a random value <L,B> of $\Gamma^{82}$.

(step 2) Alice sends L to Bob.

(step 3) Bob chooses a random element $x \in L \cap (0, 1K)$ having uniform distribution.

(step 4) Bob determines the unique $z \in I_1^n$ with $x \in Cube(zK, K)$.

(step 5) Bob sends z to Alice.

(step 6) Alice finds an element $y \in L \cap Cube(zK, K)$, using the basis B.

(step 7) Alice sends y to Bob.

(step 8) Bob computes $d_1 = x - y$.

By repeating these steps, Bob gets a sequence of elements $d_1, d_2, \ldots \in L$. Bob always checks whether the sequence contains n linearly independent elements $a_1, \ldots, a_n$. When Bob finds such elements, he computes a basis $b_1, \ldots, b_n$ from them. The length of this basis is only longer by a factor of n, than the maximum of the lengths of the vectors $a_1, \ldots, a_n$, as per the Mahler-Weyl lemma. That lemma is stated here, with the proof by induction omitted.

Assume that $a_1, \ldots, a_n \in Z^n$ are linearly independent vectors, that $d_1, \ldots, d_n \in L(a_1, \ldots, a_n)$ are also linearly independent, and that $|d_i| \leq M$. M. Then there is a basis of $L(a_1, \ldots, a_n)$ consisting of vectors no longer than nM. Moreover if $a_i$ and $d_i$ are integers for $i=1, \ldots, n$, then the required basis can be found in a time interval whose length is related to a polynomial in.

$$\sum_{i=1}^{n} (size(a_i) + size(d_i))$$

At the end of Protocol 4, Bob has a basis $b_1, \ldots, b_n$ whose length is at most $n\sqrt{n}K$.

PROTOCOL 5 (DIGITAL SIGNATURE)

The length of each message that Alice can sign by this protocol is t She can send longer messages in parts. If Alice divides a lengthy message into parts for separate transmission, she may include appropriate information, such as the total number of parts and an identification number, in each message. Doing so avoids the possibility that Bob will interpret a partial message as a complete one, or parts of different messages belonging to the same original message.

It is assumed that t is a positive integer, and that each party repeating the procedures described in Protocol 1, 2t times independently, has generated 2t public keys and 2t secret keys. That is, A published the public keys $P_1(A), \ldots, P_{2t}(A)$, and kept the secret keys $S_1(A), \ldots, S_{2t}(A)$ for private use.

Let us assume, now, that Alice wants to send a message $u_1, \ldots, u_t$ to Bob, where $u_1, \ldots, u_t$ are 0, 1 values. Protocol 5 ensures that either (i) Bob gets the complete message $u_1, \ldots, u_t$, and that he knows that it was signed by Alice (the owner of the public key P(A)), or (ii) Bob does not get signed messages from Alice at all.

So, for instance, if only part of the message arrived, then Bob would notice that the message was incomplete.

Figure 7:
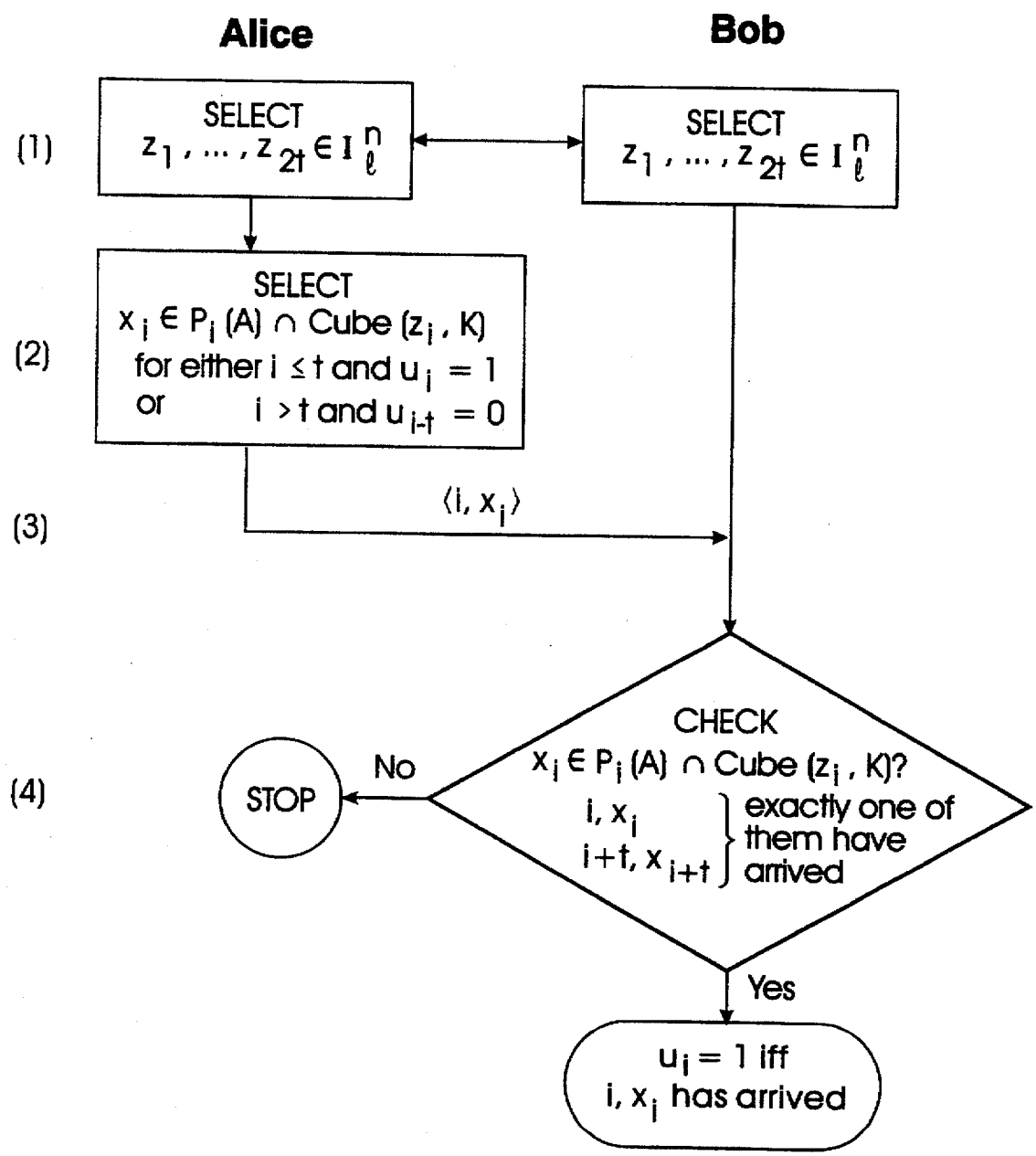
FIG. 7 is a flowchart illustrating the operation of a cryptosystem according to the invention, for executing an interactive digital signature protocol.

Protocol 5 is illustrated in the flowchart of FIG. 7, and proceeds as follows:

(step 1) Using Protocol 3, Bob and Alice repeatedly choose random 0, 1 bits, and, with their help, they generate 2t independent random values $z_1, \ldots, z_{2t} \in I_1^n$ with uniform distribution. (It is important at this step that the parties have the random bits in the same order, so it is preferable that the choice of the random bits is sequential.)

(step 2) Alice, using $S_i(A)$ and the short basis of L, generates an element $x_i \in P_i(A)$ of Cube($z_i$, K) for those values of $i=1, \ldots, 2n$ that satisfy the following: either $i \leq t$ and $u_i=1$, or $i > t$ and $u_{i-t}=0$, (step 3) Alice sends the pair $<i, x_i>$ to Bob if either $i \leq t$ and $u_i=1$, or $i > t$ and $u_{i-t}=0$, (step 4) Bob verifies whether $x_i$ is really an element of Cube($z_i$, K)$\cap P_i(A)$, and whether he got exactly one of the pairs $<i, x_i><i+t, x_{i+t}>$ for all $i=1, \ldots, t$. If yes, then he constructs the sequence $u_i$ by the rule "$u_i=1$ iff I got $<i, x_i>$", and he accepts this sequence as the signed message of Alice.

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A cryptographic communications system A comprising:
   a communications channel;
   means for generating a public key and a corresponding private key based on an instance of a problem, the problem being difficult to solve in the worst case, the instance of the problem being difficult to solve, commensurate with the difficulty of the worst-case solution of the problem; and
   means for performing a cryptographic communication protocol, employing the public and private keys generated by the means for generating, with another cryptographic communications system B over the communications channel.

2. A system as recited in claim 1, wherein the means for generating includes means for generating a public key including a lattice L.

3. A system as recited in claim 2, wherein the means for generating includes means for generating the lattice L in an n-dimensional space, the space having an origin, the lattice L including points, each of the points being representative of a respective vector from the origin to the point.

4. A system as recited in claim 3, wherein the means for generating further includes means for generating, as the private key, a solution to a lattice-related problem, the solution being applicable to a particular case of the lattice-related problem for the lattice L.

5. A system as recited in claim 4, wherein the means for generating includes means for generating, as the solution to the lattice-related problem, a solution to a problem of finding a length of a shortest non-zero vector within the lattice L, to an approximation related to the number n of dimensions in the lattice L.

6. A system as recited in claim 4, wherein the means for generating includes means for generating, as the solution to the lattice-related problem, a solution to a problem of finding a length of a shortest non-zero vector within the lattice L, to an approximation related to the number n of dimensions in the lattice L, the shortest vector v being unique in the sense that any other vector whose length is at most $n^c \|v\|$ is parallel to v, where c is a sufficiently large absolute constant.

7. A system as recited in claim 4, wherein the means for generating includes means for generating, as the solution to the lattice-related problem, a solution to a problem of finding a basis $b_1, \ldots, b_n$ in the n-dimensional lattice L whose length, defined as $\max_{i=1}^{n} \|b_i\|$, is the smallest possible up to an approximation related to the number n of dimensions in the lattice L.

8. A system as recited in claim 4, wherein the means for generating further includes means for generating, as the private key, a solution to a lattice-related problem, the solution being applicable to a particular case of the lattice-related problem for the lattice L, the solution being an approximation related to a polynomial function of the number n of dimensions in the lattice L.

9. A system as recited in claim 1, wherein the means for performing includes means for performing an identification protocol, the means for performing an identification protocol comprising:

means for sending an encrypted message to the system B;

means for receiving an inquiry from the system B, the inquiry being based on the public key; and means for responding to the inquiry with a response based on the private key, thereby providing the system B with grounds for concluding that, since only the system A had the private key based on an instance of the problem, the system A must have been the sender of the message.

10. A system as recited in claim 1, wherein the means for performing includes means for performing a bit commitment protocol.

11. A system as recited in claim 1, wherein the means for performing includes means for performing a collective coin flipping protocol for deciding a value of a random 0/1 bit.

12. A system as recited in claim 11, wherein the means for performing a collective coin flipping protocol includes means for checking whether another party is following the protocol or is cheating.

13. A system as recited in claim 11, wherein the means for performing a collective coin flipping protocol includes means for performing an identification protocol.

14. A system as recited in claim 1, wherein the means for performing includes means for performing a protocol for safely transferring a secret key.

15. A system as recited in claim 1, wherein the means for performing includes means for performing a protocol for safely transferring a subdivided message.

16. A cryptographic communications method comprising the steps of:

generating a public key and a corresponding private key based on an instance of a problem, the problem being difficult to solve in the worst case, the instance of the problem being difficult to solve, commensurate with the difficulty of the worst-case solution of the problem; and performing a cryptographic communication protocol, employing the public and private keys generated by the means for generating, with a remote cryptographic communications system B over a communications channel.

17. A method as recited in claim 1, wherein the means for generating includes generating a public key including a lattice L.

18. A method as recited in claim 2, wherein the step of generating includes generating the lattice L in an n-dimensional space, the space having an origin, the lattice L including points, each of the points being representative of a respective vector from the origin to the point.

19. A method as recited in claim 3, wherein the step of generating further includes generating, as the private key, a solution to a lattice-related problem, the solution being applicable to a particular case of the lattice-related problem for the lattice L.

20. A method as recited in claim 4, wherein the step of generating includes generating, as the solution to the lattice-related problem, a solution to a problem of finding a length of a shortest non-zero vector within the lattice L, to an approximation related to the number n of dimensions in the lattice L.

21. A method as recited in claim 4, wherein the step of generating includes generating, as the solution to the lattice-related problem, a solution to a problem of finding a length of a shortest non-zero vector within the lattice L, to an approximation related to the number n of dimensions in the lattice L, the shortest vector v being unique in the sense that any other vector whose length is at most $n^c \|v\|$ is parallel to v, where c is a sufficiently large absolute constant.

22. A method as recited in claim 4, wherein the step of generating includes generating, as the solution to the lattice-related problem, a solution to a problem of finding a basis $b_1, \ldots, b_n$ in the n-dimensional lattice L whose length, defined as $\max_{i=1}^{n} \|b_i\|$, is the smallest possible up to an approximation related to the number n of dimensions in the lattice L.

23. A method as recited in claim 4, wherein the step of generating further includes generating, as the private key, a solution to a lattice-related problem, the solution being applicable to a particular case of the lattice-related problem for the lattice L, the solution being an approximation related to a polynomial function of the number n of dimensions in the lattice L.

24. A method as recited in claim 1, wherein:

the method is performed by a cryptographic communications system A; and the step of performing includes performing an identification protocol, the means for performing an identification protocol comprising:

sending an encrypted message to the system B;

receiving an inquiry from the system B, the inquiry being based on the public key; and responding to the inquiry with a response based on the private key, thereby providing the system B with grounds for concluding that, since only the system A had the private key based on an instance of the problem, the system A must have been the sender of the message.

25. A method as recited in claim 1, wherein the step of performing includes performing a bit commitment protocol.

26. A method as recited in claim 1, wherein the step of performing includes performing a collective coin flipping protocol for deciding a value of a random 0/1 bit.

27. A method as recited in claim 11, wherein the step of performing a collective coin flipping protocol includes checking whether another party is following the protocol or is cheating.

28. A method as recited in claim 11, wherein the step of performing a collective coin flipping protocol includes performing an identification protocol.

29. A method as recited in claim 1, wherein the step of performing includes performing a protocol for safely transferring a secret key.

30. A method as recited in claim 1, wherein the step of performing includes performing a protocol for safely transferring a subdivided message.

31. A computer program product, for use with a communication and processing system A, for directing the system A to serve as a cryptographic communications system, the computer program product comprising:

a computer-readable medium;

means, available to the system A on the medium, for directing the system A to generate a public key and a corresponding private key based on an instance of a problem, the problem being difficult to solve in the worst case, the instance of the problem being difficult to solve, commensurate with the difficulty of the worst-case solution of the problem; and means, available to the system A on the medium, for directing the system to perform a cryptographic communication protocol, employing the public and private keys generated by the means for generating, with another cryptographic communications system B over the communications channel.

32. A CPP as recited in claim 1, wherein the means for directing to generate includes means, available to the system A on the medium, for directing the system A to generate a public key including a lattice L.

33. A CPP as recited in claim 2, wherein the means for directing to generate includes means, available to the system A on the medium, for directing the system A to generate the lattice L in an n-dimensional space, the space having an origin, the lattice L including points, each of the points being representative of a respective vector from the origin to the point.

34. A CPP as recited in claim 3, wherein the means for directing to generate further includes means, available to the system A on the medium, for directing the system A to generate, as the private key, a solution to a lattice-related problem, the solution being applicable to a particular case of the lattice-related problem for the lattice L.

35. A CPP as recited in claim 4, wherein the means for directing to generate includes means, available to the system A on the medium, for directing the system A to generate, as the solution to the lattice-related problem, a solution to a problem of finding a length of a shortest non-zero vector within the lattice L, to an approximation related to the number n of dimensions in the lattice L.

36. A CPP as recited in claim 4, wherein the means for directing to generate includes means, available to the system A on the medium, for directing the system A to generate, as the solution to the lattice-related problem, a solution to a problem of finding a length of a shortest non-zero vector within the lattice L, to an approximation related to the number n of dimensions in the lattice L, the shortest vector v being unique in the sense that any other vector whose length is at most $n^c \|v\|$ is parallel to v, where c is a sufficiently large absolute constant.

37. A CPP as recited in claim 4, wherein the means for directing to generate includes means, available to the system A on the medium, for directing the system A to generate, as the solution to the lattice-related problem, a solution to a problem of finding a basis $b_1, \ldots, b_n$ in the n-dimensional lattice L whose length, defined as $\max_{i=1}^{n} \|b_i\|$, is the smallest possible up to an approximation related to the number n of dimensions in the lattice L.

38. A CPP as recited in claim 4, wherein the means for directing to generate further includes means, available to the system A on the medium, for directing the system A to generate, as the private key, a solution to a lattice-related problem, the solution being applicable to a particular case of the lattice-related problem for the lattice L, the solution being an approximation related to a polynomial function of the number n of dimensions in the lattice L.

39. A CPP as recited in claim 1, wherein the means for directing to performing includes means, available to the system A on the medium, for directing the system A to perform an identification protocol, the means for performing an identification protocol comprising:

means for, available to the system A on the medium, for directing the system A to send an encrypted message to the system B;

means for, available to the system A on the medium, for directing the system A to receive an inquiry from the system B, the inquiry being based on the public key; and means for, available to the system A on the medium, for directing the system A to respond to the inquiry with a response based on the private key, thereby providing the system B with grounds for concluding that, since only the system A had the private key based on an instance of the problem, the system A must have been the sender of the message.

40. A CPP as recited in claim 1, wherein the means for directing to performing includes means, available to the system A on the medium, for directing the system A to perform a bit commitment protocol.

41. A CPP as recited in claim 1, wherein the means for directing to perform includes means, available to the system A on the medium, for directing the system A to perform a collective coin flipping protocol for deciding a value of a random 0/1 bit.

42. A CPP as recited in claim 11, wherein the means for directing to perform a collective coin flipping protocol includes means for, available to the system A on the medium, for directing the system A to check whether another party is following the protocol or is cheating.

43. A CPP as recited in claim 11, wherein the means for directing to perform a collective coin flipping protocol includes means for, available to the system A on the medium, for directing the system A to performing an identification protocol.

44. A CPP as recited in claim 1, wherein the means for directing to perform includes means, available to the system A on the medium, for directing the system A to perform a protocol for safely transferring a secret key.

45. A CPP as recited in claim 1, wherein the means for directing to perform includes means for, available to the system A on the medium, for directing the system A to perform a protocol for safely transferring a subdivided message.

* * * * *